US008633255B2

(12) United States Patent
Crews

(10) Patent No.: US 8,633,255 B2
(45) Date of Patent: *Jan. 21, 2014

(54) SAPONIFIED FATTY ACIDS AS BREAKERS FOR VISCOELASTIC SURFACTANT-GELLED FLUIDS

(75) Inventor: James B. Crews, Willis, TX (US)

(73) Assignee: Baker Hughes Incorporated, Houston, TX (US)

( * ) Notice: Subject to any disclaimer, the term of this patent is extended or adjusted under 35 U.S.C. 154(b) by 2 days.

This patent is subject to a terminal disclaimer.

(21) Appl. No.: 13/552,819

(22) Filed: Jul. 19, 2012

(65) Prior Publication Data
US 2012/0283154 A1    Nov. 8, 2012

Related U.S. Application Data

(62) Division of application No. 12/790,211, filed on May 28, 2010, now Pat. No. 8,236,864, which is a division of application No. 11/372,624, filed on Mar. 10, 2006, now Pat. No. 7,728,044.

(60) Provisional application No. 60/662,337, filed on Mar. 16, 2005.

(51) Int. Cl.
C09K 3/00 (2006.01)
C08J 3/02 (2006.01)
C09K 8/68 (2006.01)
C09K 8/70 (2006.01)

(52) U.S. Cl.
USPC .............................. 516/113; 516/99; 516/900

(58) Field of Classification Search
USPC ............................................ 516/99, 113, 900
See application file for complete search history.

(56) References Cited

U.S. PATENT DOCUMENTS 2,220,012 A    10/1940  Bruun
2,678,326 A     5/1954  Ziels
(Continued)

FOREIGN PATENT DOCUMENTS

GB    2 393 910 A  *  4/2004
WO    01/77487 A2    10/2001
(Continued)

OTHER PUBLICATIONS

Chemistry 240, "Fatty Acids, Fats and Soaps," Summer 2001, Available May 24, 2006 from: htlp://chemistry2.csudh.edulrpendarvis/ester-fats.html.

(Continued)

Primary Examiner — Daniel S Metzmaier
(74) Attorney, Agent, or Firm — Mossman Kumar & Tyler PC

(57) ABSTRACT

Fluids viscosified with viscoelastic surfactants (VESs) may have their viscosities affected (increased or reduced, e.g. gels broken) by the indirect or direct action of a composition that contains at least one fatty acid that has been affected, modified or reacted with an alkali metal base, an alkali earth metal base, ammonium base, and/or organic base compound, optionally with an alkali metal halide salt, an alkali earth metal halide salt, and/or an ammonium halide salt. The composition containing the resulting saponification product is believed to either act as a co-surfactant with the VES itself to increase viscosity and/or possibly by disaggregating or otherwise affecting the micellar structure of the VES-gelled fluid. In a specific, non-limiting instance, a brine fluid gelled with an amine oxide surfactant may have its viscosity broken with a composition containing naturally-occurring fatty acids in canola oil or corn oil affected with CaOH, MgOH, NaOH and the like.

16 Claims, 4 Drawing Sheets

(56) References Cited

U.S. PATENT DOCUMENTS

| | | | |
|---|---|---|---|
| 3,291,211 A | 12/1966 | Savins et al. | |
| 3,303,879 A | 2/1967 | Williams, Jr. | |
| 3,361,213 A | 1/1968 | Savins | |
| 4,049,686 A | 9/1977 | Ringers et al. | |
| 4,290,904 A | 9/1981 | Poper et al. | |
| 4,735,731 A | 4/1988 | Rose et al. | |
| 4,828,765 A | 5/1989 | Ohlendorf et al. | |
| 4,900,467 A | 2/1990 | Smith | |
| 5,143,635 A | 9/1992 | Young et al. | |
| 5,232,621 A | 8/1993 | Dixit et al. | |
| 5,339,855 A | 8/1994 | Hellsten et al. | |
| 5,387,362 A | 2/1995 | Tollens et al. | |
| 5,574,005 A | 11/1996 | Welch et al. | |
| 5,827,810 A | 10/1998 | Brodbeck et al. | |
| 5,902,784 A | 5/1999 | Hellsten et al. | |
| 5,911,236 A | 6/1999 | Hellsten et al. | |
| 5,964,295 A | 10/1999 | Brown et al. | |
| 5,985,817 A | 11/1999 | Weibel et al. | |
| 6,100,228 A | 8/2000 | Argo et al. | |
| 6,148,917 A * | 11/2000 | Brookey et al. | 166/301 |
| 6,239,183 B1 | 5/2001 | Farmer et al. | |
| 6,479,444 B1 | 11/2002 | Porticos et al. | |
| 6,506,710 B1 | 1/2003 | Hoey et al. | |
| 6,521,589 B2 | 2/2003 | Demeyere et al. | |
| 6,844,458 B2 | 1/2005 | Copeland et al. | |
| 6,881,709 B2 | 4/2005 | Nelson et al. | |
| 6,905,276 B2 | 6/2005 | Van Buskirk et al. | |
| 6,908,888 B2 | 6/2005 | Lee et al. | |
| 6,949,496 B1 | 9/2005 | Boutique et al. | |
| 7,036,585 B2 | 5/2006 | Zhou et al. | |
| 7,060,661 B2 | 6/2006 | Dobson et al. | |
| 7,196,041 B2 | 3/2007 | Jones et al. | |
| 7,527,102 B2 | 5/2009 | Crews et al. | |
| 7,645,724 B2 | 1/2010 | Crews | |
| 7,655,603 B2 * | 2/2010 | Crews | 507/203 |
| 7,723,272 B2 | 5/2010 | Crews et al. | |
| 7,728,044 B2 | 6/2010 | Crews | |
| 8,044,106 B2 | 10/2011 | Crews | |
| 8,188,015 B2 * | 5/2012 | Crews et al. | 507/272 |
| 8,236,864 B2 | 8/2012 | Crews | |
| 2002/0004464 A1 | 1/2002 | Nelson et al. | |
| 2002/0009424 A1 | 1/2002 | Kandathil et al. | |
| 2002/0193257 A1 | 12/2002 | Lee et al. | |
| 2004/0018955 A1 | 1/2004 | Wevers et al. | |
| 2004/0202503 A1 | 10/2004 | Van Buskirk et al. | |
| 2006/0052264 A1 * | 3/2006 | Lu | 510/238 |
| 2006/0211775 A1 | 9/2006 | Crews | |
| 2008/0161212 A1 | 7/2008 | Welton et al. | |

FOREIGN PATENT DOCUMENTS

| | | |
|---|---|---|
| WO | 02/064945 A1 | 8/2002 |
| WO | 03/093641 A1 | 11/2003 |
| WO | 2006020067 A2 | 2/2006 |
| WO | 2006102042 A1 | 9/2006 |
| WO | 2006124826 A1 | 11/2006 |

OTHER PUBLICATIONS

Lewis, Richard J., Sr. (2002). Hawley's Condensed Chemical Dictionary (14th Edition). (pp: ). John Wiley & Sons. Online version available at: http://knovel.comlweb/portal/browse/display?_EXT_KNOVEL_DISPLAY_bookid=704 & VerticalID=O , definition entry word: "soap" and "saponification".

Ophardt, C. E., "Soap", Virtual Chembook, 2003, Elmhurst College. Available May 24, 2006 from: http://www.elmhurst.edu/-chm/vchembook/554soap.html.

Thomas, Alfred, "Fats and Fatty Oils", Ullmann's Encyclopedia of Industrial Chemistry, (© 2010) John Wiley & Sons, Inc., Published online: Jun. 15, 2000, online @ http://mrw.interscience.wiley.com/emrw/9783527306732/search/firstpage, pp. 4-5.

Morales, R. H., et al., SPE 71658: "Fluid Characterization for Placing an Effective Frac/Pack," 2001 SPE Annual Technical Conference and Exhibition, New Orleans, LA, USA, Sep. 30-Oct. 3, 2001.

Rosen, Milton J., "Surfactants and Interfacial Phenomena," John Wiley & Sons, NY, NY copyright 1978, pp. 82-83, 94-99 and 120-121 May 1983.

* cited by examiner

SAPONIFIED FATTY ACIDS AS BREAKERS FOR VISCOELASTIC SURFACTANT-GELLED FLUIDS

CROSS-REFERENCE TO RELATED APPLICATION

This application is a divisional of U.S. patent application Ser. No. 12/790,211 filed May 28, 2010, issued Aug. 7, 2012 as U.S. Pat. No. 8,236,864; which is a divisional of U.S. patent application Ser. No. 11/372,624 filed Mar. 10, 2006, issued Jun. 1, 2010 as U.S. Pat. No. 7,728,044, which claims the benefit of U.S. provisional application No. 60/662,337 filed Mar. 16, 2005.

TECHNICAL FIELD

The present invention relates to gelled treatment fluids used during hydrocarbon recovery operations, and more particularly relates, in one embodiment, to methods of "breaking" or reducing the viscosity of aqueous treatment fluids containing viscoelastic surfactant gelling agents used during hydrocarbon recovery operations, as well as to increasing the viscosity of these fluids.

BACKGROUND

One of the primary applications for the viscosified fluids is hydraulic fracturing. Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates that may cause the fluids to degrade and prematurely settle out the proppant before the fracturing operation is complete. Various fluids have been developed, but most commercially used fracturing fluids are aqueous based liquids that have either been gelled or foamed. When the fluids are gelled, typically a polymeric gelling agent, such as a solvatable polysaccharide, for example guar and derivatized guar polysaccharides, is used. The thickened or gelled fluid helps keep the proppants within the fluid. Gelling can be accomplished or improved by the use of crosslinking agents or crosslinkers that promote crosslinking of the polymers together, thereby increasing the viscosity of the fluid. One of the more common crosslinked polymeric fluids is borate crosslinked guar.

The recovery of fracturing fluids may be accomplished by reducing the viscosity of the fluid to a low value so that it may flow naturally from the formation under the influence of formation fluids. Crosslinked gels generally require viscosity breakers to be injected to reduce the viscosity or "break" the gel. Enzymes, oxidizers, and acids are known polymer viscosity breakers. Enzymes are effective within a pH range, typically a 2.0 to 10.0 range, with increasing activity as the pH is lowered towards neutral from a pH of 10.0. Most conventional borate crosslinked fracturing fluids and breakers are designed from a fixed high crosslinked fluid pH value at ambient temperature and/or reservoir temperature. Optimizing the pH for a borate crosslinked gel is important to achieve proper crosslink stability and controlled enzyme breaker activity.

While polymers have been used in the past as gelling agents in fracturing fluids to carry or suspend solid particles as noted, such polymers require separate breaker compositions to be injected to reduce the viscosity. Further, such polymers tend to leave a coating on the proppant and a filter cake of dehydrated polymer on the fracture face even after the gelled fluid is broken. The coating and/or the filter cake may interfere with the functioning of the proppant. Studies have also shown that "fish-eyes" and/or "microgels" present in some polymer gelled carrier fluids will plug pore throats, leading to impaired leakoff and causing formation damage.

Recently it has been discovered that aqueous drilling and treating fluids may be gelled or have their viscosity increased by the use of non-polymeric viscoelastic surfactants (VES). These VES materials are in many cases advantageous over the use of polymer gelling agents in that they are comprised of low molecular weight surfactants rather than high molecular weight polymers. The VES materials may leave less gel residue within the pores of oil producing formations, leave no "filter cake" (dehydrated polymer) on the formation face, leave a minimal amount of residual surfactant coating the proppant, and inherently do not create microgels or "fish-eye"-type polymeric masses.

However, very little progress has been made toward developing internal breaker systems for the non-polymeric VES-based gelled fluids. To this point, VES gelled fluids have relied on "external" or "reservoir" conditions for viscosity reduction (breaking) and VES fluid removal (clean-up) during hydrocarbon production. Additionally, over the past decade it has been found that reservoir brine dilution has only a minor if any breaking effect of VES gel within the reservoir. Instead, only one reservoir condition is primarily relied on for VES fluid viscosity reduction (gel breaking or thinning), and that has been the rearranging, disturbing, and/or disbanding of the VES worm-like micelle structure by contact with the hydrocarbons within the reservoir, more specifically contacting and mixing with crude oil and condensate hydrocarbons.

However, in many gas wells and in cases of excessive displacement of crude oil hydrocarbons from the reservoir pores during a VES gel treatment, results have showed many instances where VES fluid in portions of the reservoir are not broken or are incompletely broken resulting in residual formation damage (hydrocarbon production impairment). In such cases post-treatment clean-up fluids composed of either aromatic hydrocarbons, alcohols, surfactants, mutual solvents, and/or other VES breaking additives have been pumped within the VES-treated reservoir in order to try and break the VES fluid for removal. However, placement of clean-up fluids is problematic and only sections of the reservoir interval are normally cleaned up, leaving the remaining sections with unbroken or poorly broken VES-gelled fluid that impairs hydrocarbon production. Because of this phenomenon and other occasions where reliance on external factors or mechanisms has failed to clean up the VES fluid from the reservoir during hydrocarbon production, or in cases where the external conditions are slow acting (instances where VES breaking and clean-up takes a long time, such as several days up to possibly months) to break and then produce the VES treatment fluid from the reservoir, and where post-treatment clean-up fluids (i.e. use of external VES breaking solutions) are inadequate in removing unbroken or poorly broken VES fluid from all sections of the hydrocarbon bearing portion of the reservoir, there has been an increasing and important industry need for VES fluids to have internal breakers. Internal breakers include breaker systems that use products that are incorporated within the VES-gelled fluid that are typically activated by downhole temperature that will allow a controlled rate of gel viscosity reduction over a rather short period of time of 1 to 8 hours or so, similar to gel break times common for conventional crosslinked polymeric fluid systems.

A challenge has been that VES-gelled fluids are not comprised of polysaccharide polymers that are easily degraded by use of enzymes or oxidizers, but are comprised of surfactants that associate and form viscous rod- or worm-shaped micelle structures. Conventional enzymes and oxidizers have not been found to act and degrade the surfactant molecules or the viscous micelle structures they form. It is still desirable, however, to provide some mechanism that relies on and uses internal phase breaker products that will help assure rapid and complete viscosity break of VES-gelled fluids.

It would be desirable if a non-external viscosity breaking system could be devised to break the viscosity of fracturing and other well completion fluids gelled with and composed of viscoelastic surfactants, particularly break the viscosity relatively quickly. It would also be desirable if the compositions and methods could be adjusted to increase the viscosity of the VES-gelled fluid as needed.

SUMMARY

There is provided, in one non-limiting form, a method for affecting the viscosity of aqueous fluids gelled with a viscoelastic surfactant (VES) comprising introducing into an aqueous fluid gelled with at least one viscoelastic surfactant a composition in an amount effective to increase or decrease the viscosity of the gelled aqueous fluid, where the composition comprises a soap reaction product of a fatty acid with an alkaline compound that may be an organic base, an alkali metal base, an alkali earth metal base, and/or an ammonium base.

In another non-restrictive embodiment, there is presented an aqueous fluid that includes water; at least one viscoelastic surfactant (VES) in an amount effective to increase (gel) the viscosity of the aqueous fluid and a composition in an amount effective to affect the viscosity of the gelled aqueous fluid (increase or decrease viscosity), where the composition comprises at least one soap reaction product of a fatty acid with an alkaline compound that may be an organic base, an alkali metal base, an alkali earth metal base, and/or an ammonium base.

DETAILED DESCRIPTION

Figure 1:
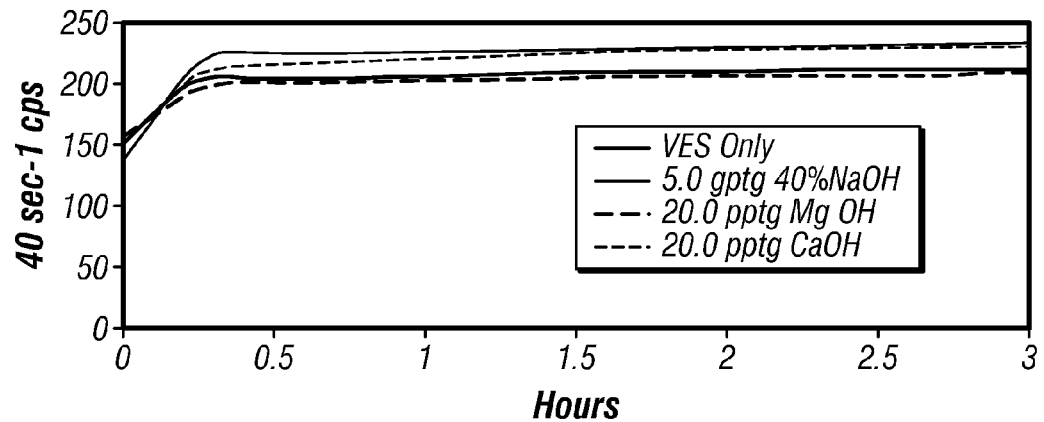
FIG. 1 is a graph showing the effect of using various types of hydroxides within WG-3L gelled fluid at 150° F. (66° C.)

As noted, aqueous fluids gelled with viscoelastic surfactants are typically used in wellbore completions, such as hydraulic fracturing, without the use of an internal breaker system, and generally rely on external downhole conditions for the VES-gelled fluid to break, such as dilution with reservoir brine and more importantly gel breaking through interaction with reservoir hydrocarbons during production of such reservoir fluids to the surface. However, reliance on external downhole conditions has provided many instances where unbroken or poorly broken VES fluid remains within the hydrocarbon section of the reservoir after a VES fluid treatment and has impaired hydrocarbon production. There are aqueous fluids gelled with viscoelastic surfactants that are known to be "broken" or have their viscosities reduced, although some of the known breaking methods utilize external clean-up fluids as part of the treatment design (such as pre- and post-flush fluids placed within the reservoir before and after well completion treatments, such as conventional gravel packing and also "frac-packing"—hydraulic fracturing followed by gravel packing treatment). There are other known methods, but they are relatively slow—for instance the use of VES-gel breaking bacteria with fluid viscosity break times ranging from half a day up to 7 days. There has evolved in the stimulation fluid art an industry standard need for "quick gel break", but for VES-gelled fluids this has been a substantially challenging problem. There needs to be a method for breaking VES-gelled fluids that is as easy, as quick, and as economical as breaking conventional crosslinked polymer fluids.

A new method has been discovered to affect the viscosity of aqueous fluids gelled with viscoelastic surfactants (i.e. surfactants that develop viscosity in aqueous brines by formation of rod- or worm-shaped micelle structures). The improvement will allow relatively very quick breaks, such as within 1 to 2 hours, compared to the current technology of using bacteria to break VES which takes at least 12 or more hours, and more typically 4 to 7 days. The viscosity-affecting components discussed herein may be added to the gel and put into solution during a VES-gel treatment and the alteration of the fatty acid or the saponification may occur during mixing and pumping of the fluid downhole. The method may also be used where most of the saponification occurs within the reservoir shortly after the treatment is over. The viscosity-affecting components may increase or decrease the viscosity of the gelled aqueous fluids. In the case of decreasing the viscosity of the aqueous gelled fluid, it is not necessary for the gel to be completely "broken" (e.g. to the approximate viscosity of water) or for all of the gel to be eliminated for the method or additive to be considered successful.

Alternatively, the components may be pre-formed and added later separately, if needed, as an external breaker solution to remove VES gelled fluids already placed downhole. In some situations it may be of utility to pre-form the soaps at the surface of a hydrocarbon recovery operation, or separate from another task. The utility of "partially pre-formed" saponification products would be to gain extra initial viscosity, regardless of the final result, that is, whether to only increase viscosity or to only completely break the viscosity.

"Complete saponification" (or near-complete saponification) at the surface (complete to near-complete pre-forming) may occur for the increase in viscosity application, but probably not for the VES-breaking application. However, complete to near-complete saponification could be used for VES-breaking when a measurable amount of near wellbore and fracture cooldown is expected before or during a treatment. SPE paper 71658 addresses how polymeric based frac pack fluids are designed in light of near-wellbore and fracture cooldown by the injection of the cooler fluids that are pumped ahead of the frac pack treatment and when required fluid efficiency is low, and is incorporated herein by reference.

Unlike the use of a co-surfactant with viscoelastic surfactants to gel an aqueous fluid, in one unique embodiment the co-surfactant or saponification or soap reaction product may be formed within the fluid in situ using one or more fatty acids and one or more metal bases. Being able to form co-surfactants in situ is a novel and unique, however, either above ground prior to a job, during the treatment, or after the treatment. It is expected that the introduction of the altered fatty acids after the treatment would be primarily for the VES breaking application.

Surprisingly and unexpectedly, it has been found that altering or reacting fatty acids that occur naturally may be used to control the viscosity of VES-gelled fluids not only to diminish their viscosity, but to increase it as well. Suitable naturally-occurring fatty acids include, but are not necessarily limited to, plant oils: e.g. corn oil, safflower oil, canola oil, olive oil, peanut oil, sunflower oil, soybean oil, almond oil, and the like; and animal oils: e.g. fish oils, mammal oils, including fats. Fats are oils that are in a solid form at ambient temperature. Preferably the natural fatty acids are in glyceride form. However, the natural fatty acids may also be in the free fatty acid form. The oil composition may be made up of various triglycerides (TG), diglycerides (DG), and/or monoglycerides (MG). Additionally, the use of oils that are higher in polyunsaturated fatty acids PUFA) and/or monounsaturated fatty acids (MUFA) than saturated fatty acids (SFA) are of utility, and in many non-restrictive cases preferred. While artificially created fatty acids would be expected to be useful herein as well, such as hydrogenated or partially hydrogenated fatty acids, or various fatty acids manufactured from petroleum crude stock, naturally-occurring fatty acids in the glyceride form would be expected in many cases to be more economical and versatile for practicing the methods and compositions herein.

In one non-limiting embodiment, the alteration of fatty acids by an alkali or alkali earth metal base may improve the viscosity of a VES-gelled fluid over 100%. In an alternate, non-restrictive embodiment, the alteration or modification may be designed to completely reduce the VES viscosity of the fluid. The use of this chemical technology is simple and economical to use. In one non-limiting case, up to 50% less VES gelling agent (i.e. surfactant) may be used in one application to achieve the same viscosity or gelling effect. A relatively small amount of altered fatty acid is needed for enhancing the VES fluid viscosity. In another, different application, the VES fluid viscosity breaks back to water, or water viscosity. In this application two or more times the amount of altered fatty acids are typically required to decrease and completely break the VES fluid viscosity, as compared with the relatively smaller amounts needed to enhance the VES fluid viscosity. The amount needed for either application is dependant on several factors, which include VES concentration, fluid temperature, mix water salinity, type and amount base saponifying agents used, and the like.

For increasing VES fluid viscosity no noticeable by-products or phase separations occur: that is, the amount of fatty acid soap that is formed to enhance the VES fluid viscosity is a relatively small amount and appears to readily associate with the larger amount of viscoelastic surfactants present in the fluid; thereby the soap readily stays soluble or dispersed within the viscosity enhanced fluid. For the embodiment of breaking VES fluid viscosity, typically about two or more times the amount of soap compounds (i.e. amount of saponified fatty acids formed) are required, with total amount of soap needed depending on the types and amounts of soaps formed, fluid temperature, VES concentration, mix water salinity, and the like. It has been found that soaps formed by divalent ions have more breaking activity than monovalent forms: that is "hard soaps" more readily degrade VES viscosity than "soft soaps". Hard soaps are defined herein to include, but are not necessarily limited to, calcium, magnesium and the like soaps. Soft soaps are defined herein to include, but not necessarily be limited to, sodium, potassium, triethanolamine, and the like soaps. Hard soaps are known to be much less soluble in water than soft soaps and can, at high enough concentrations, in certain VES fluids and under certain conditions potentially precipitate and scale. In one non-limiting enhancement herein, to resolve the potential occasions where hard soap precipitation may occur, a ratio of soft to hard soap may be of utility: that is, the ratio of soft soap to hard soap may be optimized where the soft soaps aids the solubility and dispersibility of the hard soaps formed, with the ratio of them controllable to limit a potential phase separation or precipitating of hard soap from the broken VES fluid. In another non-limiting enhancement, one or more hard soap "solubilizers" besides the viscoelastic surfactant and soft soaps described herein may be used. There are several common hard soap solubilizers and chemistries that may be of utility for this invention. A non-limiting example is BASF products JORDAPON® CI and ACI, which are sodium and ammonium cocoyl isethionate surfactants commonly used in the personal care industry, which have a Lime Soap Dispersion Index of about 17 parts sodium or ammonium cocoyl isethionate to 100 parts calcium oleate, can be used to solubilize or disperse hard soaps generated by this invention, with ammonium cocoyl isethionate being the most preferred. Other suitable hard soap solubilizers or dispersants include, but are not necessarily limited to, sodium laureth-13 carboxylate, ammonium laureth-13 carboxylate. Different alkali metal forms of these solubilizers, such as the potassium and lithium forms, may also be useful. In other non-limiting examples alkyl glucosides, alkyl glycols, and the like solubilizers or dispersants may be utilized.

Controlled viscosity reduction rates may be achieved from 75° F. to about 280° F., in one non-limiting embodiment. In another non-limiting embodiment these gel-breaking products work by rearrangement of the VES micelle type or structure from rod-shaped or worm-shaped elongated structures to more spherical structures. In other words, the compositions herein will reduce the viscosity of the gelled aqueous fluid either directly, or by disaggregation or rearrangement of the VES micellar structure. Disaggregating may be understood in one non-limiting embodiment when the micelles are not closely associated physically, that is no longer aggregated together, as contrasted with rearrangement which may be understood as a different physical arrangement or aggregation that has reduced viscosity. However, the inventor does necessarily not want to be limited to any particular mechanism.

The use of the disclosed breaker system is ideal for controlled viscosity reduction of VES based fracturing fluids. The breaking system may also be used for breaking gravel pack and loss circulation pill fluids composed of VES. This VES breaking method is a significant improvement in that it gives breaking rates for VES based fluids that the industry is accustomed to with conventional polymer based fracturing fluids, such as borate crosslinked guar. This improvement surpasses many prior methods that require reliance on external downhole conditions to break the VES fluid viscosity.

Alternatively, the products of interaction of fatty acids with saponifying agents listed herein may be used to improve or increase the viscosity of the VES-gelled fluids in such a way that the effective amount of VES needed may be reduced, yet give the same or increased viscosity or gelling power. In this embodiment, the ability of the VES-gelled fluid to transport sand, proppant or other particulates may also be improved. While it is expected that the effect of the use of metal bases together with fatty acids will either increase VES-gelled fluid viscosity or decrease the viscosity, it is not expected that in most cases both would occur simultaneously. It may be possible in some non-limiting embodiments that first an increase in viscosity and then a decrease in viscosity may occur. It has been discovered that in at least one instance both effects may occur sequentially (please see Example 5 and FIG. 5).

U.S. Pat. No. 6,506,710 to Hoey, et al., incorporated herein by reference in its entirety, concerns viscoelastic surfactants and compositions thereof for underground use, such as in stimulation fluids, drilling muds, fracturing fluids, and in applications such as permeability modification, gravel packing, cementing and the like; similar uses to those herein. This document teaches limits on the amount of free fatty acids that should be present in the compositions to enhance the product's performance vs. temperature. Free fatty acid contents are listed, that is the inventors therein list a range of how much fatty acid may be used or included within the final product composition. However, there is no teaching about how the chemistry of these fatty acids is functioning, other than that some optimum amount of free fatty acid improves product yield and viscosity at temperatures up to 80° C.

It has been discovered herein that compositions such as those of the '710 patent include about 1.0 to about 2.0 bw free fatty acids. These fatty acids may be used, and alternatively and possibly more importantly the addition of certain specific types and amounts of plant oils into VES-gelled fluid, may be altered by adding an alkali (e.g. Na, K, Cs, etc.) and/or alkali earth metal (e.g. Ca, Mg, Ba, etc.) base (e.g. in oxide form or in hydroxide form—such as NaOH, MgOH, CaOH, etc.), organic bases, or ammonium bases ($(CH_3)_4NOH.5H_2O$, $NH_4OH$, etc.), and optionally with ammonium, alkali metal and alkali earth metal salts ($(CH_3)_4NCl$, $NH_4Cl$, $KCl$, $NaBr$, $MgCl_2$, $CaCl_2$, $CaBr_2$, etc.) for "saponification" of the fatty acids into "soap" compounds. In one non-limiting embodiment, it may be that the anions of the salts exchange with those of the base(s) in an effective or advantageous way, although the inventor does not want to be limited to any particular explanation. As with the selection and use of various types of oils, additional or combination of inorganic bases, organic bases, or bases with salts may be employed to optimize the soap compounds that are formed upon saponification. Other suitable bases include, but are not limited to various valences of hydroxides and oxides of Fe, Mn, Cu, Zn, Zr, Mo, V, Co, Al, Sn and the like; and alkaline organic base ions such as: diethanolamine, triethanolamine, choline, and the like. The type of "soap" compounds that are produced may be controlled, along with their amount, to alter the VES gel micelles in useful ways.

Stated another way, the methods and compositions herein involve base-altered fatty acid, more specifically, fatty acids within or introduced into a VES-gelled fluid may be selectively altered by controlled saponification to yield various types and amounts of soap compounds. These compounds may be formed during product use, in one non-limiting embodiment, during the mixing and pumping of a fluid into a well. These compounds or products may be used to substantially improve fluid viscosity or to break down the rod-shaped or worm-shaped VES micelles to regular, spherically-shaped, non-viscous micelles in a brine medium, such as a fluid used in a hydrocarbon recovery operation.

When these compounds or products are used to improve fluid viscosity, the operator will save on the cost of VES gelling agent, which is typically more expensive than the soap compounds. Less VES gelling agent may be used to save money and reduce VES fluid costs to the operator and to make VES technology more affordable.

The application of "breaking" the VES fluid viscosity, i.e. using the soap compounds to reduce the VES viscosity, should improve VES gel clean-up from a reservoir after a treatment or operation. The breaking mechanism herein involves certain types and amounts of saponified fatty acid compounds that will interfere with the VES surfactant's association and cause the VES rod/worm-shaped micelles to become more unstable over time. This gives a controlled VES gel break likely due to rearranging the micelles to a more spherical shape or structure, composed of regular VES surfactants and the formed soap surfactants allowing complete viscosity reduction, little to no gel break residue, and the fluid should clean up the reservoir more easily and possibly in a more enhanced way that may improve hydrocarbon production. The use of this internal breaker system by itself or in combination with external downhole breaking conditions should help assure and improve hydrocarbon production compared to many prior methods that use only external mechanisms to break the VES fluid for effective and complete VES fluid clean-up after a treatment. The methods and compositions herein may be for flowback of a fracturing fluid, or additionally for clean-up of VES diverter fluids during wellbore or matrix acidizing. It is expected that the chemical technology described herein will help resolve clean-up problems.

More specifically, the use of fatty acids, and, more importantly, the addition of specific types and amounts of plant and related oils into a VES gelled fluid, and then altering them through adding an alkali and/or alkali earth metal base and/or organic base "saponifies" the fatty acids into soap. The addition and presence of salts may also influence the saponification reactions and type or types of soap that are generated over time. Suitable alkali metals include, but are not necessarily limited to sodium, potassium, cesium, and combinations thereof. Suitable alkali earth metals include, but are not necessarily limited to calcium, magnesium, barium, and combinations thereof. In another non-limiting embodiment, these metals may be introduced in the form of bases, particularly hydroxides, such as NaOH, MgOH, CaOH, etc. In another non-limiting example the metals may be also introduced by the addition of salts, such as $KCl$, $NH_4Cl$, $NaBr$, $MgCl_2$, $CaCl_2$, $CaBr_2$, etc. That is, a blend of two or more bases, organic bases, or bases with salts may be used to give custom soap compounds that achieve viscosity increase, decrease, or both sequentially, or control the saponification rate. In other words, the type of "soap" compounds that are produced may be controlled, along with their amounts and their water solubility, dispersibility, and association with one another. A blend of two or more oils may be used to give custom soap compounds that achieve the same effective results. In addition, two or more specific bases, or specific bases and salts, and two or more specific plant or other oils may be combined to achieve the same or better results as compared to using one. That is, the custom soap compounds may be generated in a variety of ways and give the methods and fluids even greater functionality compared to other VES breaking mechanisms prior to this point in time.

The stoichiometric ratio of the base (such as NaOH) to fatty acids (such as canola oil) may be important. Using less base and not fully saponifying the fatty acids may have some utility. One non-restrictive example would be to change the reaction rate, that is, the rate of saponification, i.e. how much fatty acid soap is present in fluid over time. Changing the rate may be needed at elevated temperatures (in one non-limiting instance, above about 180° F. (82° C.)), and this may be one method of controlling rate, e.g. slowing it down. It should be noted that the type and amount of base may control the rate of saponification. Combinations of bases and also the type and amount of fatty acids may also be used to control rate of saponification. Each oil has a different fatty acid composition, that is, different types and amounts of the various fatty acids (i.e. triglycerides in particular, but most oils also include diglycerides, monoglycerides, and free fatty acids; and the fatty acids within oils also vary in length of carbon chain, amount of double carbon bonds, placement of double bonds, and the like), and further each oil may also have different types and amounts of natural impurities (non-fatty acid constituents) that may influence rate of saponification.

In most cases however, a stoichiometric excess amount of metal base relative to the fatty acid functionality would probably be used. One would generally want to use or alter all of the fatty acids present to maximize the possible cost and performance benefits, since in many non-limiting embodiments the objective is to generate sufficient fatty acid soap to increase or to decrease VES fluid viscosity. Rather than barely using just enough metal base stoichiometrically, one would likely want to add a slight excess for assurance in achieving the necessary amount of saponification. Excess base will promote all of the fatty acid functionality added to become saponified (overbase). However, there may be cases where type and amount of excess fatty acids may of utility.

The presence and use of salts with bases may influence the initial portion of saponification products generated and may continue to influence the type and amount of specific soap compounds formed over time. With the presence of pH buffering systems, such as boric-borate, acetic-acetate, etc., or the use of slowly solubilizing pH altering compounds, the fluid pH can be optimized to influence the type of base present with various types of salts present in the VES fluid over time.

Additionally, the presence and use of chelants, including but not necessarily limited to, aminocarboxylic acids, iminodisuccinates, polyaspartates, gluconates, and the like may influence the saponification products generated. In particular, use of chelants may influence the metal-base species that may be present or generated along with the type of salts present over time, including as the VES fluid temperature shifts, e.g. during initial fluid heat-up as the fluid is pumped downhole or upon reaching final temperature within the reservoir. One non-limiting example is a specific type of chelants that may be of utility, such as $K_5DTPA$ versus $NH_2EDTA$, to vary the rate of alkali earth metal-base disassociation and the type and amount of cation exchange as a method or mechanism to optimize rate and type of saponification. Another non-limiting example would be the use of one or more polymer to influence the interaction of the viscoelastic surfactant and types of soaps formed. Other agents besides salts, pH buffers, polymers, solubilizers, scale inhibitors, and chelants may be found to be of utility to optimize or further alter the saponification chemistry, the soaps generated, and their association with the viscoelastic surfactant and with one another.

It is expected that the compositions and methods herein would be suitable within a temperature range of about 75 to about 280° F. (about 24 to about 138° C.), and in another non-restrictive version between a lower limit of about 90° F. (32° C.) to an optional upper limit of about 230° F. (110° C.).

In the gel-breaking and viscosity-enhancing embodiment herein, it is difficult, if not impossible, to specify with accuracy the amount of the various viscosity-affecting components that should be added to a particular aqueous fluid gelled with viscoelastic surfactants to sufficiently or fully break the gel, in general. For instance, a number of factors affect this proportion, including but not necessarily limited to, the particular VES used to gel the fluid, the particular fatty acid and metal base used and their proportions, the temperature of the fluid, the downhole pressure of the fluid, the starting pH of the fluid, and the complex interaction of these various factors. Nevertheless, in order to give an approximate feel for the proportions of the various viscosity-affecting components to be used in the methods and compositions herein, approximate ranges will be provided. The amount of soap reaction product that may be effective in the methods and fluids herein may range from about 50 to about 20,000 ppm, based on the total amount of the fluid. In another non-restrictive, the amount of soap reaction product may range from an alternative lower limit of about 500 ppm to a non-restrictive upper limit of about 12,000 ppm.

For a given reservoir temperature the fluid will be exposed and heated to, whether the VES fluid viscosity increases or decreases is dependant on the amount or proportion of fatty acid soap compounds formed. For instance, as a non-limiting generality, at relatively low concentrations viscosity enhancement occurs, while at relatively higher concentrations viscosity decrease occurs.

Additionally, in each of the cases above, the amount is dependant on the given temperature. That is, the lower the temperature, the more fatty acid soap compounds may be present and still function as viscosity enhancers, whereas the higher the temperature the less fatty acid soap compounds may be present for viscosity enhancement. Further, if too much fatty acid soap compounds are present for a given temperature viscosity decrease (VES micelle breaking or reshaping) will occur. At lower temperature more fatty acid soap compounds must be present in order to achieve VES viscosity breaking, whereas at higher temperature less fatty acid soap compounds are required to completely break VES micelle viscosity.

Any suitable mixing apparatus may be used for this procedure. In the case of batch mixing, the VES and the aqueous fluid are blended for a period of time sufficient to form a gelled or viscosified solution. The VES that is useful may be any of the VES systems that are familiar to those in the well service industry, and may include, but are not limited to, amines, amine salts, quaternary ammonium salts, amidoamine oxides, amine oxides, mixtures thereof and the like.

Viscoelastic surfactants improve the fracturing (frac) fluid performance through the use of a polymer-free system. These systems, compared to polymeric based fluids, may offer improved viscosity breaking, higher sand trans-port capability, and are in many cases more easily recovered after treatment than are polymers, and are relatively non-damaging to the reservoir with appropriate contact with sufficient quantity of reservoir hydrocarbons, such as crude oil and condensate. The systems are also more easily mixed "on the fly" in field operations and do not require numerous co-additives in the fluid system, as do some prior systems.

The viscoelastic surfactants suitable for use herein include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or dipropionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2O^-$ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amidoamine oxide gelling agent is Akzo Nobel's AROMOX APA-T formulation, which should be understood as a dipropylamine oxide since both R' groups are propyl.

Suitable materials include CLEARFRAC™, which may also comprise greater than 10% of a glycol. One preferred VES is an amine oxide. As noted, a particularly preferred amine oxide is APA-T, sold by Baker Oil Tools as SUR-FRAQ™ VES. SURFRAQ is a VES liquid product that is 50-65% APA-T and from about 25-40% propylene glycol. These viscoelastic surfactants are capable of gelling aqueous solutions to form a gelled base fluid. The additives herein may be used to prepare a VES fluid system, sold by Baker Oil Tools as DIAMOND FRAQ™. DIAMOND FRAQ™ with its assured breaking technology overcomes reliance on external reservoir conditions in order to break, as compared with products such as CLEARFRAC™.

The method and compositions herein also cover commonly known materials as AROMOX APA-T manufactured by Akzo Nobel and other known viscoelastic surfactant gelling agents common to stimulation treatment of subterranean formations.

The amount of VES included in the fracturing fluid depends on at least two factors. One involves generating enough viscosity to control the rate of fluid leak off into the pores of the fracture, and the second involves creating a viscosity high enough to keep the proppant particles suspended therein during the fluid injecting step, in the non-limiting case of a fracturing fluid. Thus, depending on the application, the VES is added to the aqueous fluid in concentrations ranging from about 0.5 to 25% by volume, alternatively up to about 12 vol % of the total aqueous fluid (from about 5 to 120 gallons per thousand gallons (gptg)). In another non-limiting embodiment, the range for the present methods and compositions is from about 1.0 to about 6.0% by volume VES product. In an alternate, non-restrictive form, the amount of VES ranges from 2 to about 10 volume %.

It is expected that the viscosity-affecting compositions herein may be used to reduce or increase the viscosity of a VES-gelled aqueous fluid regardless of how the VES-gelled fluid is ultimately utilized. For instance, the viscosity breaking or improving compositions could be used in all VES applications including, but not limited to, VES-gelled friction reducers, VES viscosifiers for loss circulation pills, fracturing fluids, gravel pack fluids, viscosifiers used as diverters in acidizing (including foam diverters), VES viscosifiers used to clean up drilling mud filter cake, remedial clean-up of fluids after a VES treatment (post-VES treatment), in regular or foamed fluid forms (i.e. the fluids may be "energized" with or the gas phase of foam being $N_2$ or $CO_2$), and the like.

A value of the methods and compositions herein is that a fracturing or other fluid may be designed to have enhanced breaking characteristics. That is, fluid breaking is no longer dependant on external reservoir conditions for viscosity break: the rate of viscosity reduction, if essentially complete break is achieved, occurs more completely throughout the reservoir interval. Importantly, better clean-up of the VES fluid from the fracture and wellbore may be achieved thereby. Better clean-up of the VES directly influences the success of the fracture treatment, which is an enhancement of the well's hydrocarbon productivity. Previous VES fluid clean-up limitations and failures may now be overcome or improved by the use of this clean-up technology.

In order to practice the methods and compositions herein, an aqueous fracturing fluid, as a non-limiting example, is first prepared by blending a VES into an aqueous fluid. The aqueous fluid could be, for example, water, brine, aqueous-based foams or water-alcohol mixtures. Any suitable mixing apparatus may be used for this procedure. In the case of batch mixing, the VES and the aqueous fluid are blended for a period of time sufficient to form a gelled or viscosified solution. Alternatively, the viscosity-affecting compositions may be added separately.

Propping agents are typically added to the base fluid after the addition of the VES. Propping agents include, but are not limited to, for instance, quartz sand grains, glass and ceramic beads, bauxite grains, walnut shell fragments, aluminum pellets, nylon pellets, and the like. The propping agents are normally used in concentrations between about 1 to 14 pounds per gallon (120-1700 kg/m³) of fracturing fluid composition, but higher or lower concentrations may be used as the fracture design required. The base fluid may also contain other conventional additives common to the well service industry such as water wetting surfactants, non-emulsifiers and the like. As noted, the base fluid may also contain other non-conventional additives which may contribute to the viscosity affecting action of the VES fluid, and which are added for that purpose.

Any or all of the above saponification products may be provided in an extended release form such as encapsulation by polymer or otherwise, pelletization with binder compounds, absorbed or some other method of layering on a microscopic particle or porous substrate, and/or a combination thereof. Specifically, the plant, fish and/or animal oils may be micro and/or macro encapsulated to permit slow or timed release thereof. In non-limiting examples, the coating material may slowly dissolve or be removed by any conventional mechanism, or the coating could have very small holes or perforations therein for the soap or saponification products within to diffuse through slowly. For instance, a mixture of fish gelatin and gum arabic encapsulation coating available from ISP HALLCREST may be used to encapsulate plant, fish and other oils. Also, polymer encapsulation coatings such as used in fertilizer technology available from Scotts Company, specifically POLY-S® product coating technology, or polymer encapsulation coating technology from Fritz Industries could possibly be adapted to the oxide and/or hydroxide bases used in the methods and compositions herein. The saponification products could also be absorbed onto zeolites, such as Zeolite A, Zeolite 13X, Zeolite DB-2 (available from PQ Corporation, Valley Forge, Pa.) or Zeolites Na-SKS5, Na-SKS6, Na-SKS7, Na-SKS9, NaSKS10, and Na-SKS13, (available from Hoechst Aktiengesellschaft, now an affiliate of Aventis S.A.), and other porous solid substrates such as MICRO-SPONGE™ (available from Advanced Polymer Systems, Redwood, Calif.) or placed within microscopic particles such as carbon nanotubes or buckminster fullerenes. Further, the "soaps" or component reactants may be both absorbed into and onto porous or other substrates and then encapsulated or coated, as described above.

In a typical fracturing operation, the fracturing fluid may pumped at a rate sufficient to initiate and propagate a fracture in the formation and to place propping agents into the fracture. A typical fracturing treatment would be conducted by mixing a 20.0 to 60.0 gallon/1000 gal water (volume/volume—the same values may be used with any SI volume unit, e.g. 60.0 liters/1000 liters) amine oxide VES, such as SUR-FRAQ, in a 2% (w/v) (166 lb/1000 gal, 19.9 kg/m$^3$) KCl solution at a pH ranging from about 6.0 to about 13.5. The breaking components are typically added during the VES addition using appropriate mixing and metering equipment, or if needed in a separate step after the fracturing operation is complete.

In one non-limiting embodiment, the method is practiced in the absence of gel-forming polymers and/or gels or aqueous fluid having their viscosities enhanced by polymers. However, combination use with polymers and polymer breakers may also be of utility. For instance, polymers may also be added to the VES-gelled fluid for fluid loss control purposes. Types of polymers that may serve as fluid loss control agents include, but are not necessarily limited to, various starches, polyvinyl acetates, polylactic acid, guar and other polysaccharides, gelatins, and the like.

The present methods and compositions will be explained in further detail in the following non-limiting Examples that are only designed to additionally illustrate them but not narrow the scope thereof.

GENERAL PROCEDURE FOR EXAMPLES 1-8

To a blender were added tap water, 3 wt % KCl, followed by 4 vol % viscoelastic surfactant (WG-3L—AROMOX® APA-T from Akzo Nobel). The blender was used to mix the components on a very slow speed, to prevent foaming, for about 30 minutes to viscosify the VES fluid. Mixed samples were then placed into plastic bottles. Various components singly or together, in various concentrations, were then added to each sample, and the sample was shaken vigorously for 60 seconds. The samples were placed in a water bath at the indicated temperature and visually observed every 30 minutes for viscosity difference between the samples. Since a goal of the research was to find a relatively rapid gel breaking composition, samples were only observed for 2 to 6 hours.

Viscosity reduction may be visually detected. Shaking the samples and comparing the elasticity of gel and rate of air bubbles rising out of the fluid may be used to estimate the amount of viscosity reduction observed. Measurements to acquire quantitative viscosity reduction of each sample were obtained using a Brookfield PVS rheometer. Tests were performed at 150° F. (66° C.) with 300 psi (2.1 MPa) pressure and 40 sec$^{-1}$ shear, except for Examples 6 and 7 which were run at 180° F. (82° C.).

EXAMPLE 1

Shown in FIG. 1 is a graph of the effect of using various types of hydroxides within WG-3L gelled fluid at 150° F. (66° C.). A viscosity increase was observed with the addition of NaOH and CaOH. The viscosity increase may be due to NaOH and CaOH base-mediated saponification of fatty acids from WG-3L product, and these particular saponified fatty acids appear to act as viscosity enhancing co-surfactants at the concentrations generated and conditions tested. Gelling agent WG-3L typically has 1.0 to 2.0% bw free fatty acids within the final product composition. In a 4.0% by WG-3L gelled fluid the free fatty acid content typically ranges from 0.04 to 0.08% by (0.4 to 0.8 gptg).

EXAMPLE 2

Figure 2:
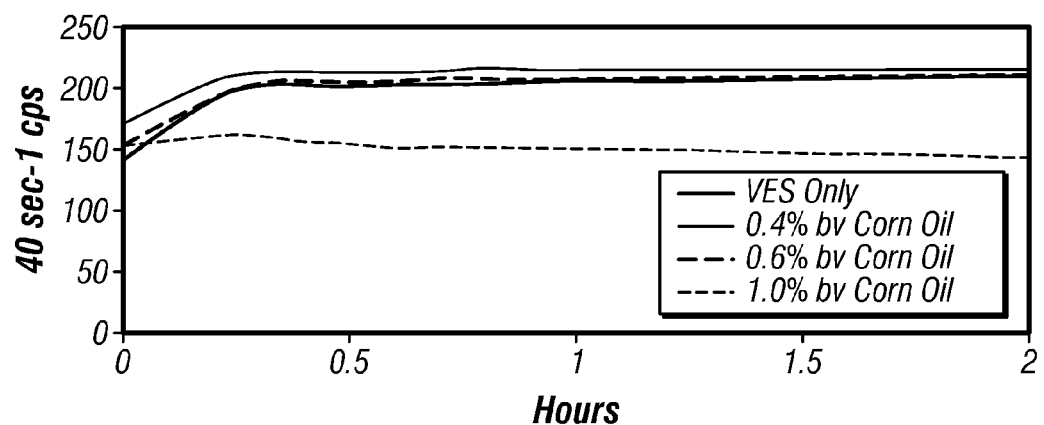
FIG. 2 is a graph showing the effects of using varying amounts of vegetable oil (corn oil) within WG-3L gelled fluid at 150° F. (66° C.)

Shown in FIG. 2 are the test results showing the effect of using varying amounts of vegetable oil within WG-3L fluid at 150° F. (66° C.). Tests show that up to approximately 0.6% by corn oil has minor to no gelled effect on VES fluid viscosity, but at higher corn oil concentrations VES micelle structure and viscosity is proportionally degraded by the oil alone.

EXAMPLE 3

Figure 3:
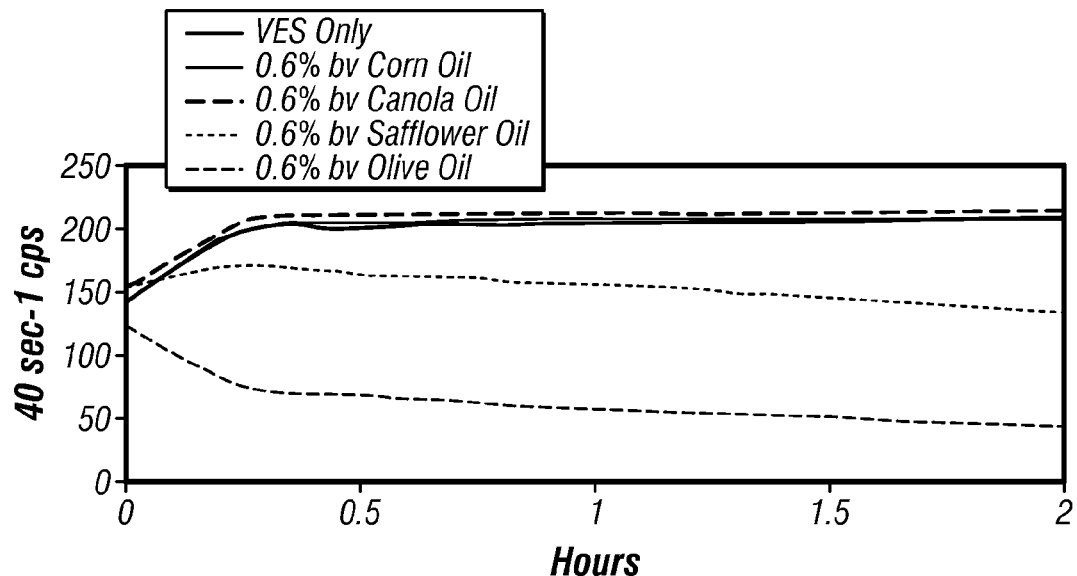
FIG. 3 is a graph of showing the effects of using various different types of vegetable oil from those of FIG. 2 within WG-3L gelled fluid at 150° F. (66° C.)

Shown in FIG. 3 are test results showing effect of using various types of vegetable oil within WG-3L gelled fluid at 150° F. The data shows that up to approximately 0.6% by corn or canola oils have little effect on VES fluid viscosity. However, 0.6% by safflower (which is the relatively higher oleic-type) and olive oil (Bertolli Extra Light type) both measurably reduce VES gel viscosity and micelle structure.

EXAMPLE 4

Figure 4:
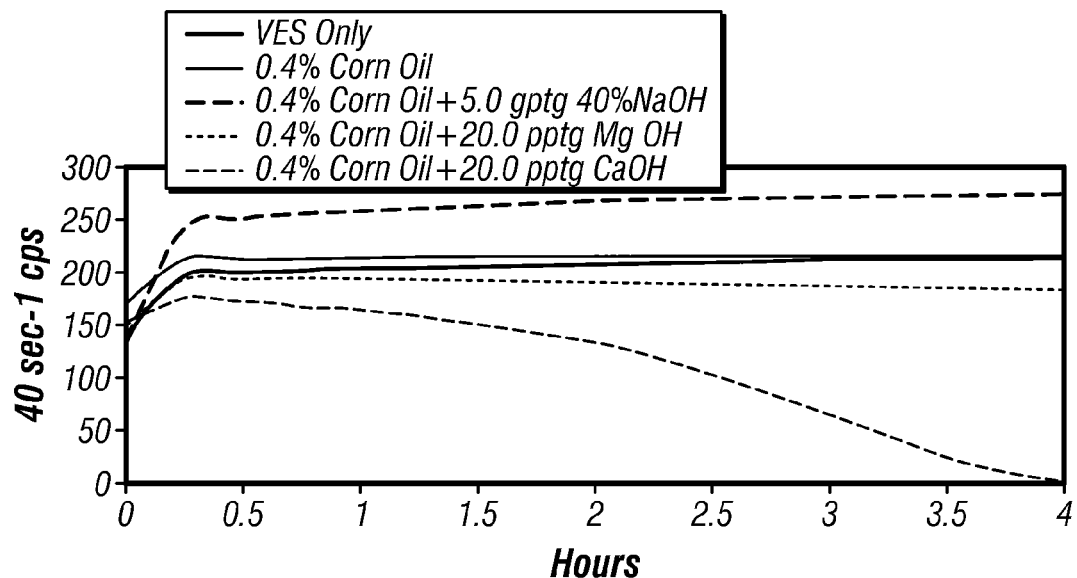
FIG. 4 is a graph showing the effects of using various common hydroxides within WG-3L gelled fluid that contains 0.4% by corn oil.

Shown in FIG. 4 are the effects of using various common hydroxides within WG-3L gelled fluid that contains 0.4% by corn oil. The substantial increase in viscosity by addition of NaOH (approximately 25.0% increase) may be due to NaOH-mediated saponification of the added corn oil fatty acids and the free fatty acids contained in the WG-3L product. The decrease and eventual complete break in VES gel viscosity by CaOH addition may be due to the type and amount of CaOH base-mediated saponification that occurs over time at 150° F. (66° C.) with corn oil fatty acids.

EXAMPLE 5

Figure 5:
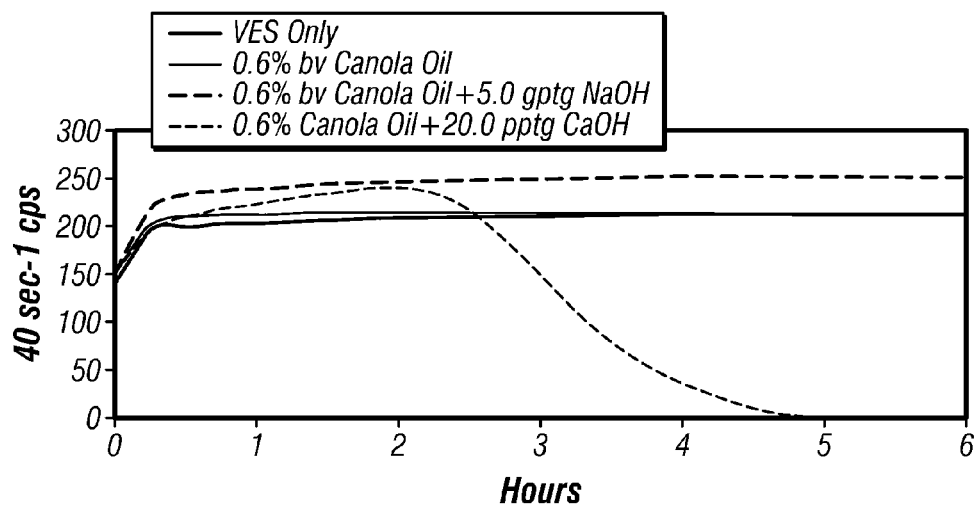
FIG. 5 is a graph showing the effects of using two common hydroxides within WG-3L gelled fluid that contains 0.6% by canola oil.

Test results showing the effects of using two common hydroxides within WG-3L gelled fluid that contains 0.6% by canola oil are shown in FIG. 5. The addition of NaOH appears to show NaOH-mediated saponification of canola oil enhances viscosity, but not quite as much as NaOH-mediated saponification of corn oil, as seen in FIG. 4. The initial viscosity increase followed by rapid and complete viscosity reduction by CaOH addition may be due to the type and amount of CaOH base-mediated saponification that occurs over time at 150° F. (66° C.) with canola oil fatty acids. So far the only base found to work in decreasing VES micelle viscosity is CaOH, but it is expected that others may be found.

EXAMPLE 6

Test results showing the effects of using two hydroxyl compounds within WG-3L gelled fluid that contains 0.2% by canola oil at 180° F. (82° C.) are presented in FIG. 6. The addition of triethanolamine appears to produce saponified compounds that have very little viscosity effect at concentration and conditions tested. The addition of CaOH appears to show saponified compounds are formed that substantially increase the fluid viscosity at concentrations and conditions tested.

EXAMPLE 7

Figure 7:
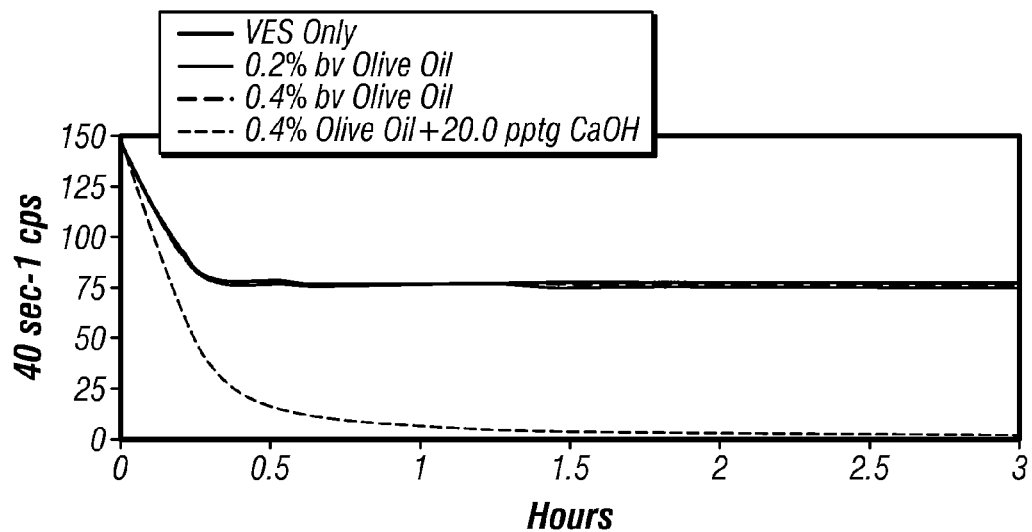
FIG. 7 is a graph showing the effects of using various amounts of Bertolli Extra Virgin type olive oil within WG-3L gelled fluid and when CaOH is then added with olive oil.

Test results showing the effects of using various amounts of Bertolli Extra Virgin type olive oil within WG-3L gelled fluid and when CaOH is then added with olive oil are presented in FIG. 7. The data shows the VES viscosity is not affected by the Bertolli Extra Virgin type olive oil at concentrations up to 0.4% by at 180° F. over the first three hours of fluid heating. The data shows that once CaOH is added to the 0.4% by extra virgin olive oil that VES viscosity decreases very rapidly, indicating the type and the amount of saponification (type and amount of "soap") formed readily breaks the VES micelle structure under conditions tested. Less of each should give a relatively slower break time.

EXAMPLE 8

Figure 8:
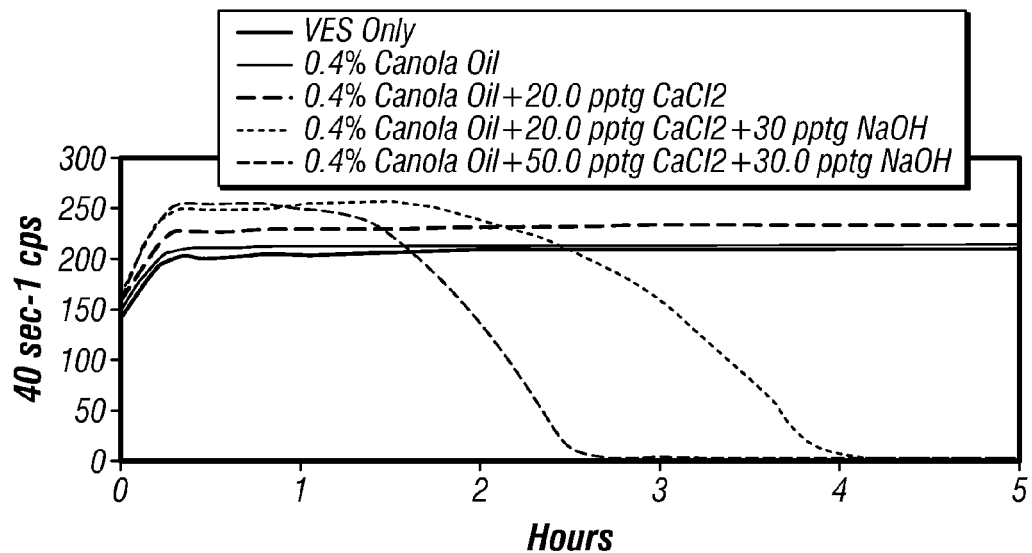
FIG. 8 is a graph showing the effects of using readily water soluble components to saponify canola oil at 150° F. (66° C.).

Test results showing the effects of using highly water soluble metal-base and salt within WG-3L gelled fluid that contains 0.4% canola oil are shown in FIG. 8. The metal-base selected was NaOH and the salt was $CaCl_2$. The data shows that canola oil alone at 0.4% had no negative or positive influence on the VES fluid viscosity. With the addition of 20 pptg $CaCl_2$ the VES fluid containing canola oil had slightly enhanced fluid viscosity. With NaOH present the initial viscosity was further enhance but after about 1.5 hours the VES fluid viscosity began to drop and the fluid viscosity was completely broken after about 4 hours. The next test using an additional amount of $CaCl_2$ salt showed about the same enhancement of initial viscosity but VES breaking started at about 1 hour with the VES fluid completely broken at about 2.5 hours. This data appears to show that soluble saponification agents may be used with common fatty acid oils to enhance, and more particularly in this case, break VES viscosity in a controllable manner as would be needed for designing a VES fluid with breaker for a frac-packing, gravel-packing, and the like stimulation treatment.

Tests thus show that a highly soluble monovalent base can be used with a highly soluble divalent salt to generate VES breaking saponified soap compounds that give a controllable fluid viscosity break over time.

For the embodiment of increasing the VES viscosity, the soap compounds appear to act as co-surfactants: they interact, associate, and become part of the VES elongated micelle, and when present in the VES micelle in low concentrations (for a given temperature) they enhance the VES surfactants in producing more robust worm-like micelle structures, although the inventor does not want to be limited by any particular theory.

Example 6 (FIG. 6) shows that a small amount of canola oil (0.2% by) does not change or decrease the VES viscosity at 180° F. (82° C.). The data also show that once 10.0 pptg CaOH is added to the 0.2% by canola oil in the VES fluid, the base substantially enhances the VES fluid viscosity (FIG. 6).

Figure 6:
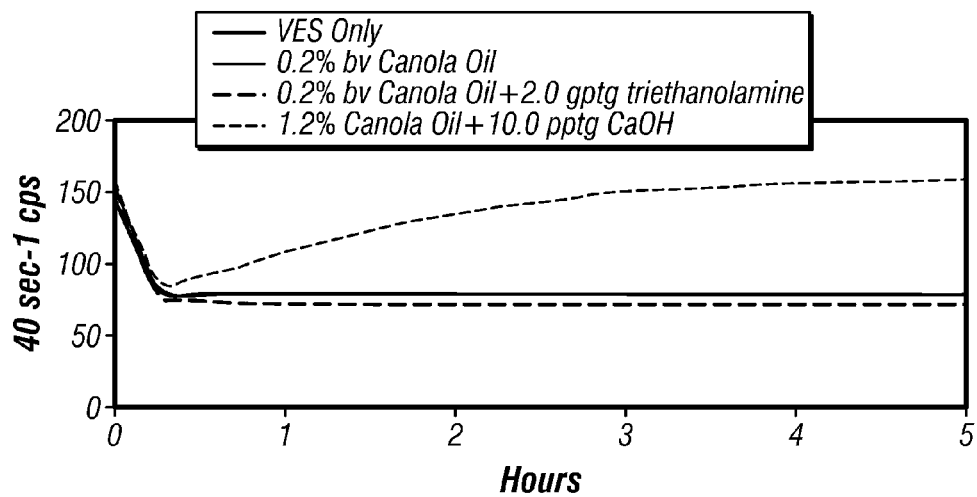
FIG. 6 is a graph showing the effects of using two hydroxyl compounds within WG-3L gelled fluid that contains 0.2% by canola oil at 180° F. (82° C.)

Fatty acid soap compounds are formed by the canola oil and CaOH reaction, such as in Examples 5 and 6 (FIGS. 5 and 6, respectively). At the concentrations generated for the given temperature, the fatty acid soap compounds increase the fluids' viscosity (FIG. 6). The fatty acid soap compounds formed apparently interact with the VES surfactants. The interaction makes the VES worm-like micelle structure more robust (enhanced). This enhancement of the VES micelle appears to mean at lower concentrations these particular fatty acid soap compounds appear to function as co-surfactants in helping the VES surfactant (WG-3L) work better in forming viscous worm-like micelles and thereby help yield more viscosity, although again the methods and compositions herein should not be limited by any supposed explanation.

It was also found that all of the complete viscosity reduction test fluids (e.g. reacting enough CaOH with enough fatty acids at a given temperature to achieve complete VES micelle viscosity degradation or break) at test temperatures of 100° F. (38° C.) and above, showed reheal viscosity when these same "broken" fluids were cooled down to 75° F. (24° C.). The reheal viscosity in many cases was substantially higher than the initial VES fluid viscosity before saponification at 75° F. (24° C.). The substantially higher viscosity is often noticed as a "floppy gel", similar to crosslinked polymer fracturing fluids. By "floppy gel" it is meant that the fluid has relatively less pour and more retracting character than it initially had.

The reheal viscosity phenomenon shows that the amount of CaOH-based soap compounds formed at one temperature and which yielded complete VES gel break at an elevated temperature is not enough to break or rearrange the micelles at a cooler temper, such as 75° F. (24° C.). This reheal viscosity also shows that the (e.g. CaOH-based) soap compounds do appear to act as cosurfactants at cooler temperatures, but at the elevated test temperature the same compounds act as VES gel breakers, causing complete viscosity reduction. Thus, whether a VES fluid has increased viscosity or decreased viscosity depends at least in part on the amount of soap compound (CaOH-based, in one non-limiting embodiment) for a given temperature.

Additionally, an inventive test fluid has been heated until it was completely broken in viscosity, and then the fluid was maintained at that test temperature an additional 2 hours at the broken viscosity (viscosity of water). Upon cooling down the fluid completely rehealed in viscosity and showed a very floppy gel character. The same fluid was put back on the rheometer and approximately as the fluid reached the former test temperature, the fluid viscosity was reduced back to water—that is, a fully broken gel).

It has also been demonstrated in part, as shown in FIG. 8, that readily water soluble compounds may be used for viscosity enhancement or viscosity breaking, depending on the amount of each component added. This chemistry may further optimize the time in situ saponification takes place and the products are generated.

It may thus be seen that methods are provided for breaking and/or increasing the viscosity of aqueous treatment fluids gelled with viscoelastic surfactants (VESs). Compositions and methods have been described for increasing and/or breaking VES-surfactant fluids where the additive is in a phase internal to the VES-surfactant fluid. Further, compositions and methods have been demonstrated for breaking VES-gelled fluids where contact with reservoir fluids as an external breaking mechanism is not required. Compositions and methods have also been shown for increasing the viscosity of and/or breaking VES-surfactant substrates fluids relatively quickly. Additionally, methods and VES fluid compositions are provided for breaking and/or increasing the viscosity of aqueous fluids gelled with viscoelastic surfactants using readily available materials at relatively inexpensive concentrations.

In the foregoing specification, the methods and compositions have been described with reference to specific embodiments thereof, and has been demonstrated as effective in providing methods and compositions for a VES fracturing fluid breaker mechanism. However, it will be evident that various modifications and changes may be made thereto without departing from the broader spirit or scope of the invention as set forth in the appended claims. Accordingly, the specification is to be regarded in an illustrative rather than a restrictive sense. For example, specific combinations of viscoelastic surfactants, fatty acids, base compounds, and other components falling within the claimed parameters, but not specifically identified or tried in a particular composition or fluid, are anticipated to be within the scope of this invention.

What is claimed is:

1. An aqueous fluid comprising:
water;
at least one viscoelastic surfactant (VES) in an amount effective to increase the viscosity of the aqueous fluid to form a gelled aqueous fluid, where the VES is selected from the group consisting of an amine oxide, an amidoamine oxide, and combinations thereof, where the VES gels the aqueous fluid by forming elongated micelles; and
a composition in an amount effective to break the gelled aqueous fluid, where the composition comprises a glyceride oil containing a fatty acid, the composition further comprising at least one soap reaction product of the fatty acid with an alkaline compound selected from the group consisting of organic bases, alkali metal bases, alkali earth metal bases, ammonium bases and combinations thereof.

2. The fluid of claim 1 where the fatty acid is selected from the group consisting of those found in plant oils, animal oils and fish oils, and where the alkali metal base, alkali earth metal base and ammonium base is selected from the group consisting of oxides and hydroxides of cations selected from the group consisting of Na, K, Cs, Ca, Mg, Ba, Fe, Mn, Cu, Zn, Zr, Mo, V, Co, Al, Sn, $NH_4$, and mixtures thereof, and where the organic base is selected from the group consisting of diethanolamine, triethanolamine, choline bases and mixtures thereof.

3. The fluid of claim 1 where the soap reaction product is further formed with a salt selected from the group consisting of an alkali metal halide salt, an alkali earth metal halide salt, an ammonium halide salt, and mixtures thereof.

4. The fluid of claim 1 where the amount of soap reaction product ranges from about 50 to about 20,000 ppm, based on the gelled aqueous fluid.

5. The fluid of claim 1 where there are no other viscosity decreasing agents in the gelled aqueous fluid besides the soap reaction product(s).

6. The fluid of claim 1 where the composition further comprises at least one hard soap solubilizer or dispersant.

7. The fluid of claim 6 where the hard soap solubilizer or dispersant is selected from the group consisting of sodium cocoyl isethionate, ammonium cocoyl isethionate, sodium laureth-13 carboxylate, ammonium laureth-13 carboxylate, alkyl glucosides, and alkyl glycols, and mixtures thereof.

8. The fluid of claim 1 where the soap reaction product decreases the viscosity of the gelled aqueous fluid with essentially no residual by-products or essentially no phase separation.

9. The fluid of claim 1 further comprising an oil-soluble internal phase containing the at least one soap reaction product.

10. The fluid of claim 1 where the aqueous fluid is selected from the group consisting of fracturing fluids, proppant carrying fluids, gravel packing fluids, lost circulation pills, permeability-modifying fluids, diverter fluids, clean up fluids, and foamed fluids.

11. An aqueous fluid comprising:
water;
at least one viscoelastic surfactant (VES) in an amount effective to increase the viscosity of the aqueous fluid to form a gelled aqueous fluid, where the VES is selected from the group consisting of an amine oxide, an amidoamine oxide, and combinations thereof, where the VES gels the aqueous fluid by forming elongated micelles; and
a composition in an amount effective to break the gelled aqueous fluid, where the composition comprises a glyceride oil containing a fatty acid, the composition further comprising at least one soap reaction product of the fatty acid with an alkaline compound selected from the group consisting of organic bases, alkali metal bases, alkali earth metal bases, ammonium bases and combinations thereof, where:
the soap reaction product is present in the fluid in an amount effective to break the gelled aqueous fluid;
the fatty acid is selected from the group consisting of those found in plant oils, animal oils and fish oils;
the alkali metal base, alkali earth metal base and ammonium base is selected from the group consisting of oxides and hydroxides of cations selected from the group consisting of Na, K, Cs, Ca, Mg, Ba, Fe, Mn, Cu, Zn, Zr, Mo, V, Co, Al, Sn, $NH_4$, and mixtures thereof, and
the organic base is selected from the group consisting of diethanolamine, triethanolamine, choline bases and mixtures thereof.

12. The fluid of claim 11 where the soap reaction product is further formed with a salt selected from the group consisting of an alkali metal halide salt, an alkali earth metal halide salt, an ammonium halide salt, and mixtures thereof.

13. The fluid of claim 11 where the amount of soap reaction product ranges from about 50 to about 20,000 ppm, based on the gelled aqueous fluid.

14. The fluid of claim 11 where there are no other viscosity decreasing agents in the gelled aqueous fluid besides the soap reaction product(s).

15. The fluid of claim 11 where the composition further comprises at least one hard soap solubilizer or dispersant.

16. The fluid of claim 11 where the soap reaction product decreases the viscosity of the gelled aqueous fluid with essentially no residual by-products or essentially no phase separation.

\* \* \* \* \*